United States Patent [19]
Gabriel

[11] 4,317,422
[45] Mar. 2, 1982

[54] BIKE FOR TRAVELLING OVER WATER

[76] Inventor: Naeem B. Gabriel, 20 Smith St., Jersey City, N.J. 07306

[21] Appl. No.: 180,091

[22] Filed: Aug. 21, 1980

Related U.S. Application Data

[63] Continuation of Ser. No. 41,704, May 23, 1979.

[51] Int. Cl.³ .............................................. B60F 3/00
[52] U.S. Cl. ..................................... 114/270; 440/12; 440/30
[58] Field of Search ..................... 440/11, 12, 21, 30, 440/31, 100; 114/270

[56] References Cited

U.S. PATENT DOCUMENTS

| | | | |
|---|---|---|---|
| 271,799 | 2/1883 | Coomans | 114/270 |
| 1,060,620 | 5/1913 | Osofs et al. | 114/270 |
| 1,869,139 | 7/1932 | Gargiulo | 114/270 |
| 2,990,804 | 7/1961 | Garehime | 440/31 |
| 4,092,945 | 6/1978 | Ankert et al. | 114/270 |

FOREIGN PATENT DOCUMENTS 772914 12/1967 Canada ................................. 440/30

Primary Examiner—Sherman D. Basinger

[57] ABSTRACT

It is an assembly, when attached to a bike, renders it possible todrive it on water as on land. To buoy the bike and make it float on water, floaters which have the shape of convex lenses, or half of a ball, were used. Each one of those floaters was made to spin around a shaft which is specially designed so as not to slide, when fixed by brackets to the frame of the bike. The powered wheel carries cylindroid, fastened to the spokes in it, to do the rowing action. Another type of floaters which may be used, are of the shape of the letter U, and each one partially surrounds a wheel, and is supported to the frame of the bike, at its wheel's axle level. Also a disc that carries a number of half hyperboloid section, may do the rowing action, once they are put inside the powered wheel. The foot pedals are equipped with platens, to assist the rowing action.

1 Claim, 10 Drawing Figures

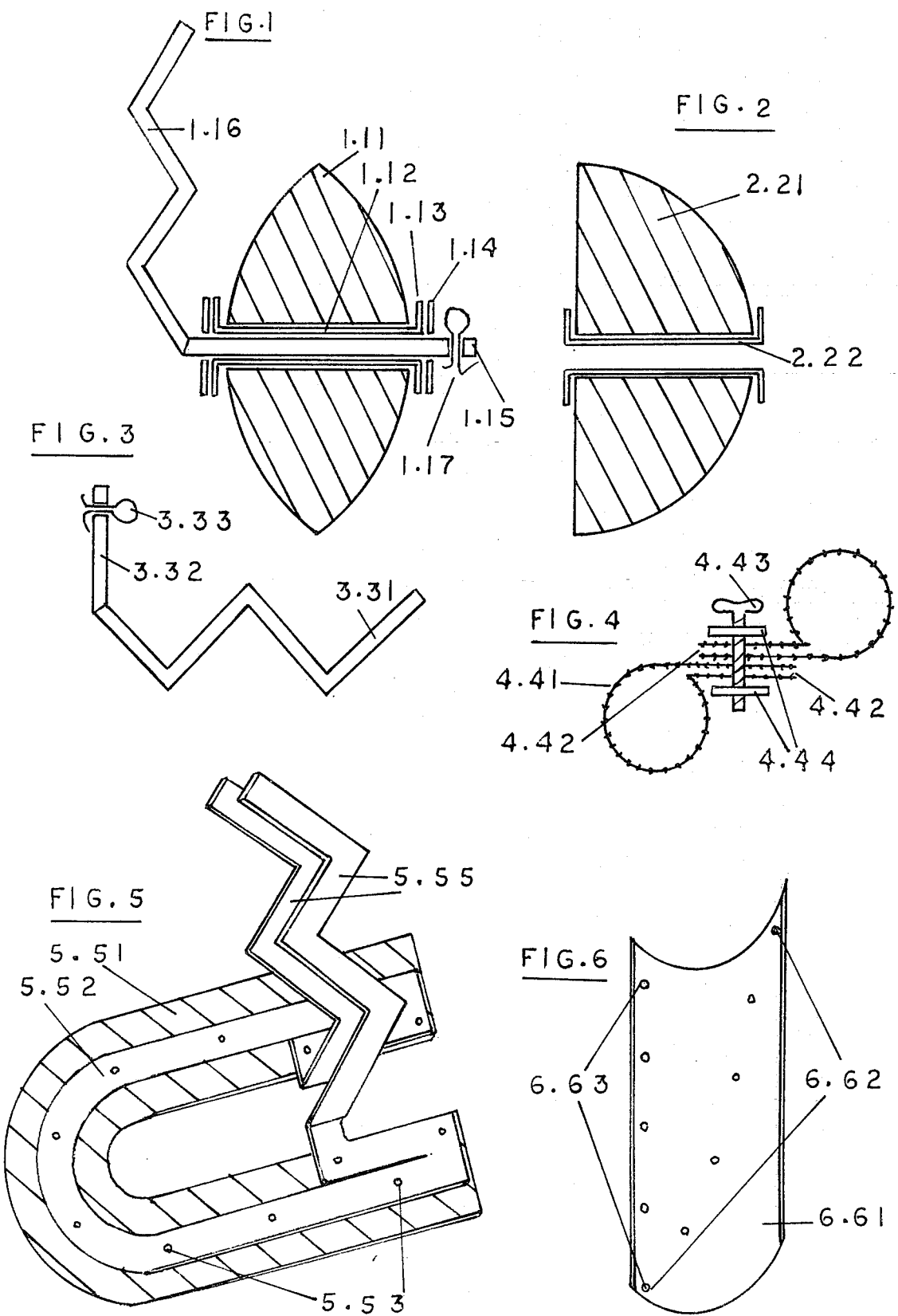

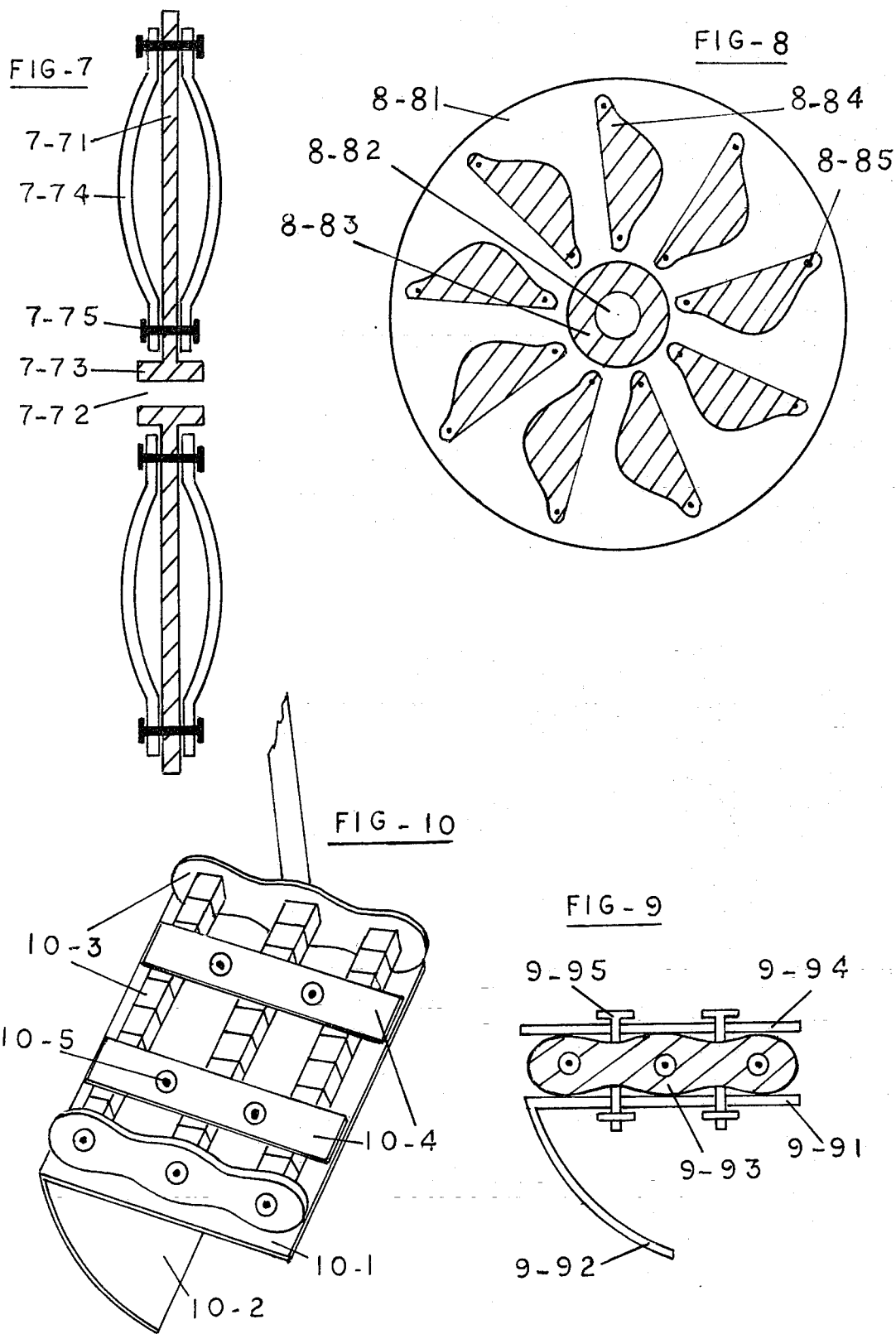

BIKE FOR TRAVELLING OVER WATER

This application is a continuation to application Ser. No. 041,704, filed May 23, 1979, which was called "Rowing Bike".

BACKGROUND OF THE INVENTION (1) Field of the invention

What I submit here is a compact assembly, which enables a rider of a bike to drive it on water in the same manner he drives it on land.

Notice: Whenever the word bike is mentioned, it indicates either a bicycle, motorbike, or a motorcycle.

This application is following the main streamline and subject, of the abandoned application Ser. No. 713,974 (art unit 315) submitted before, filing date Aug. 12, 1976; and which was called also "Rowing Bike".

(2) Description of the prior art

Many inventions dealt with the same idea or subject, that is a bike or a floater which drives on water by means of a pedalling action. U.S. Pat. No. 1,869,139 by Gargiulo which he called hydrocycle, is an example. He claimed a floater, comprising a disc, covered on one side by inflatable rubber, or two spaced discs, with a water tight covering engaged over one of the discs, and secured on the face of the other. And I thought that using inflatable rubber is a little bit risky on water, since it is liable to be pinched, and causes the bike to sink. Also upon speeding on water it will give a rough ride, because the rubber is elastic. He claimed also a rowing mechanism fixed on said floaters, which comprises many rods, many cams, and many moving parts, and I found that I can offer a less complicated system.

His method requires changing the design of the conventional bike to give the propelling action to the floaters. The bike also confronts great opposition from the water, because the floaters are wide, which requires strong pedalling. And it takes a job to set up or, dismantle the assembly to switch from driving on water or on land.

I found another invention by Petroskey U.S. Pat. No. 3,640,239, which he called a float apparatus for a bicycle, and in which the design is bulgy, heavy, and not practical to be driven on land when completely assembled. It also requires a special mechanism to give the steering action to the propelling means, and one misses the simplicity in the rowing means, the steering means, or the pedal assist means.

I mention here another U.S. invention U.S. Pat. No. 271,799 by Coomans, which he called marine velocipede. His design is suitable and designed specially for tricycles, and only for the very old type of them which have huge tires, so they are unadaptable to the bikes in the market now. Special types of tires for floatation are needed; their size should be huge, and the rubber tire must have extended fins moulded in them, to do the rowing action. U.S. invention U.S. Pat. No. 839,476 by Hartlett which he called water transportation means, needs a special wide fork frame, to be able to take the tire, and two auxilliary inflatable tubular tires for floatation, one piece on each side of the wheel. He also claimed inflatable floaters, and their delicate telescopic support means, and it is clear that such water transportation means should be driven slowly, heavy vehicles like motorcycles could not be used, also heavy people will find it like walking on a wire, and the center of gravity is limited to a narrow area. He also claimed special types of paddles secured to the spokes in the wheel, and the bending of the spokes is apt to occur in his design.

In U.S. invention U.S. Pat. No. 3,397,669 by Katehis which he called amphibious vehicle; he claimed horizontally extending pontoons, and they are hollow. Besides that he claimed specially designed propulsion means which require a new type of rear wheels, still the simplicity in construction is missing here.

Two other inventions will be mentioned here just for comparison. One of them is by Nilsson U.S. Pat. No. 2,169,391 called water unicycle, where he used a circular, tubular, rubber wheel, to buoy his device; and it is clear that said device has a limited use.

As of the other U.S. Pat. No. 698,184; an Italian invention by Mezzano Adolfo; which he called the floater propelled by pedalling, he used a floating board that has special foot pedals, equiped so as to do rowing, it is also evident that his invention is of limited use. Also for comparison the following U.S. patents were cited, Osofs U.S. Pat. No. 1,060,620, Garehime U.S. Pat. No. 2,990,804, and Ankert U.S. Pat. No. 4,092,945, besides a Canadian Pat. No. 772,914 by Tremblay.

I am offering here a design which is simple in construction; yet it is strong, and sturdy for the purpose it is used for. It is safe to use without risk, and encounters less friction with water; it is also cheap and does not need altering in the construction or the mechanism of the bike.

It is also light in weight, and compact, which allows it to be driven on land without even dismantling it. For all those factors mentioned; I believe that my new embodiment excells over the other ones mentioned before, and it is practical.

SUMMERY OF THE INVENTION

The rowing bike is an assembly simple in construction, and with its aid, a bike could be driven on water as on land. It consists of 4 buoying means, and each one of them may be of the shape of a magnifying lens, or half a ball. Two of these floaters are needed for each wheel in the bike, one on each side of the wheel. Each floater spins around an axle, which is inserted in the middle of the floater. The floater may resemble the shape of the letter U—and in such case 2 floaters are needed; one for every wheel in the bike. It partially surrounds the wheel without touching it. With the aid of a bar which is fastened to the midst of this floater, and whose two ends are tilted like a letter L, the floater will be attached to the frame of the bike at the wheel's axle level. As for the rowing means, equally spaced cylindroid are provided for the powered wheel, and they are attached to the spokes in it to do the rowing action. In another design, a disc with a centered hole, is put inside the powered wheel, and said disc sits on the axle of the wheel and extends to touch its circumference. The disc carries a number of half hyperboloid section, which take equally spaced positions on both its sides, and they pair. Their function is to do the rowing action.

As of the pedal, each one of them carries a paddle assist, to help in the rowing action.

The detailed description of the new embodiment is submitted right after the drawings, which are numbered for referals.

BRIEF DESCRIPTION OF THE DRAWINGS

FIG. 1 is a cross section, in a floater that has the shape of a convex lens 1-11, and in its center is a crossing tube 1-12, and at its ends are the discs 1-13 to trap the floater. Two washers 1-14, one on each side of said tube, are used to lessen the friction. The floater spins around a shaft 1-15, which is the extended member of the principle supporting means that resembles the letter W (1-16); which has an extended member. This extension is perpendicular on the plane on which the letter W shaped support is written, as of 1-17; it is a locking pin.

FIG. 2 is a cross section in a floater of the shape of half a ball 2-21. Also the tube 2-22 which crosses it is similar to that one in FIG. 1.

FIG. 3 is a supporting shaft bent like a letter W 3-31 of which one member is extended 3-32. The extended straight member is bent for 90 degrees, to lay on a plane perpendicular on that one on which the letter W is written. The end of the shaft carries a locking pin 3-33.

FIG. 4 is a cross section in two combined half flat brackets 4-41, where the flat members 4-42 of both brackets are touching. Both brackets are bound together by means of a screw 4-43, and two nuts 4-44. That bracket assembly can attach two shafts together, even if there was an angle between them.

FIG. 5 shows a U shaped floater 5-51 and it is supported at its midst by a U shaped bar 5-52 by means of screws and nuts 5-53. At the end of the floater 5-51 the bar is acutely bent backwards; then bent 90 degrees towards the inside, then with another upward twist of 90 degrees, it will be adapted to attach to the frame of the bike that holds the wheel. The ends 5-55 are bent like a letter W, to help the assembly not to slide from its place on the frame to which it was attached by the brackets mentioned before. The two members of the ends of the bar are parallel to the two members of the U shaped floater; and to one another.

FIG. 6 is the view of one of the cylindroid 6-61 that is to be attached to the spokes in the powered wheel. It shows the holes in it 6-62 & 6-63, and how they are distributed on it.

FIG. 7 shows a cross section view in a rowing disc 7-71, and how the hyperboloid sections 7-74 are paired on both sides of that disc. It shows also the thickening or the seat 7-73 around the centered hole 7-72 in it. The screws that hold the paired sections are 7-75.

FIG. 8 is a side view of the rowing disc 8-81, and the centered hole in it is 8-82, whereas the thickening is 8-83, as of 8-84, they are the equally spaced half hyperboloid sections, and 8-85 are the screws that attach the pairs together.

FIG. 9 is a cross section view of the rowing foot pedal, 9-91 is the flat portion of the paddle assist, and 9-92 is the curved surface. The foot pedal is 9-93. The screws and nuts 9-95 hold the bars 9-94 to the platen 9-91.

FIG. 10 is a view of the paddle assist 10-1 and its curved portion 10-2, and over the foot pedal 10-3 we find the two bars 10-4, where they hold to the paddle assist by screws and nuts.

DETAILED DESCRIPTION OF THE ROWING BIKE

Bikes could be made to drive on water the same way they are driven on land, by buoying the bike on specially designed floaters, to lessen the friction with water, and also by providing suitable rowing means attached to the powered wheel in said bike, and also to its foot pedals.

To keep the bike floating on water, I used buoying means of the shape of convex lens, FIG. 1, or half a ball FIG. 2, or of the shape of the letter U in FIG. 5; for the front and rear wheels. FIG. 1 is a cross section in a floater of the shape of a convex lens 1-11, best design to lessen the friction with water. The floater is made of rigid foam; the type used in surfboards, then is covered with a protective layer of rubber or plastic. The floater has a centered hole that crosses it from one side to another, and reinforced with a rigid tube 1-12 so it will not chip under pressure. On each side of said tube, at its ends, there is a disc 1-13 to trap the floater. Through that tube is inserted the end 1-15; of a specially designed shaft 1-16. Four shafts are needed for four floaters, one for each floater; whereon it freely rotates or spins around.

There is a washer 1-14 on each side to lessen the friction; and as of 1-17; it is a locking pin to prevent the floater from leaving the shaft. Each bike needs at least four of the mentioned floater's assembly to buoy it on water, one floater on each side of the wheel; outside the frame of the bike. The floater can take the shape of half a ball, FIG. 2, and said floater 2-21 has that same crossing tube 2-22, and another assembly similar to that one mentioned before; in FIG. 1.

A specially designed shaft shown in FIG. 3, is used. It is of the shape of a letter W with an extended member as in 3-31, and around its portion 3-32, the floater spins. That extension is then bent for 90 degrees, wherein it will be perpendicular on that plane over which the letter W is written. The principle portion 3-31 is the one which is to be attached to the frame of the bike, whereas the other member 3-32 extends as a continuation to the axle of the wheel. As of why the shaft is designed to have that shape that is to prevent it from sliding over the frame of the bike under pressure, once they are attached together by suitable brackets in two or three points, any also prevent it from swerving. Another advantage of said design, is that it can handle different variations in the frame's dimension. A locking pin is 3-33.

The means of attaching the shaft to the frame of the bike, is by using the pair of half flat 4-42 paired brackets 4-41 in FIG. 4. They are joined together by a screw 4-43 and two nuts 4-44 through a hole in them. Said pair of brackets can join two bars together whatever the angle is there between them. The surfaces of the brackets, in or out, are made course to prevent sliding and, to increase the friction between the metal parts.

It is evident that the size of the floater varies according to the weight of the bike, the size of its tire, and the weight of the rider, but it should come smaller in diameter than that of the wheel, so it will not hinder pedalling, and also, to be over the ground level to avoid loading on them when driving on land in case they were not dismanteled. The ideal position when the bike and its rider are on the water, is when the surface of the water levels with the axle of the wheels, and for such reason, the position of the shaft may be varied, and so its length, to be able to carry even more than one floater if needed.

Another alternative assembly to buoy the bike is shown in FIG. 5, and it is a wide piece of wood or surfboard, cut as the shape of a big fat letter U (FIG. 5-51), wherein the groove inside it is wide enough for one wheel of the bike to fit in; to about three quarters of its diameter. A bar 5-52 centered above said U shaped floater, is attached to it by screws and nuts 5-53. Both ends of the bar 5-52 are acutely bent backwards at the ends of the floater, then the bar is bent once more 90 degrees towards the inside, and then with an upward twist of another 90 degrees, there will be furnished a means to attach the floater to the frame; or fork of the bike, to which the wheel is secured. The position of the floater is adjusted to horizontally level with the axle of the wheel. It is worth mentioning, that the ends of the bar 5-55, are bent like the letter W wherein they are attached to the frame, for the reasons mentioned in a former paragraph. It is clear that two of such floaters are needed, since each wheel in the bike requires one of these floaters.

What was mentioned before took in account the floating means of the bike, and what will follow will deal with the rowing means for it, in which I used three different methods.

In one of them, cylindroids were used, and FIG. 6 shows one of these cylindroids. It is made of rigid plastic or metal, 6-61 and its length is the distance between the axle of the wheel and its circumference, and wide enough to touch the spokes on both sides of the powered wheel. Each cylindroid 6-61 has holes in it arranged in a special manner, some are arranged on the line which reaches between two opposite corners 6-62, and others are on the longer distance between two consecutive corners 6-63. A number of these cylindroids are needed to fit in the powered wheel of said bike; which is the wheel that gives the moving power: and they are evenly distributed and equally spaced in it; and that is by using suitable means inserted in the holes, and then hung on the spokes. All the curved surfaces face one direction, which is counterclockwise and which fits on the plane of the wheel. Distributing the holes in the cylindroid according to that manner mentioned before, will save the spokes from being bent under pressure.

A second method that may be used to achieve the rowing action is using the rowing disc, and FIG. 7 is a cross section in it, and FIG. 8 is a side view of it.

The disc 7-71 and 8-81 has a centered hole in it 7-72 and 8-82, and around the hole there is a seat or a thickening 7-73 and 8-83. The disc is well seated on the axle of the powered wheel by means of said thickening, and carries on both sides a number of half hyperboloid section 7-74 and 8-84. These sections pair on both sides of the disc, as they take evenly spaced positions on it. By means of screws and nuts 7-75 and 8-85, those sections are held together through holes in them as well as in the disc.

The disk extends to the rim of the wheel, and is positioned on the wheel's plane. All the half hyperboloid sections on it, open to one direction, as they rotate with the rotation of the disk. And so when pedalling, the powered wheel will spin around in the water forcing the disc to rotate, and so also do the cylinderoids, and that will cause the bike to move.

The last method that I used to accelerate the rowing action, is by using the rowing pedal or the paddle assist, and FIG. 9 is a cross section in the rowing pedal, and FIG. 10 is a view of the paddle assist attached to the foot pedal. The paddle assist is a strong platen, of about six inches long and eight inches wide, then bent from its middle to form two surfaces one perpendicular on the other. One part 9-91 and 10-1 is left flat, and it is the one that is to be put under the foot pedal 9-93 and 10-3 when it is in its lowest positions, whereas the other part is bent slightly to the inside to form a curvature 9-92 and 10-2. Two small flat bars 9-94 and 10-4 are put over the foot pedal, and by means of screws and nuts 9-95 and 10-5, the two flat bars and the paddle assist are held together with the foot pedal in between them. It is clear that the whole assembly will freely rotate together, and when pedalling, the curved surface will push the water past the floating bike, thus causing it to move. Each one of the two foot pedals in the bike requires a paddle assist.

What I claim is:

1. A bike for traveling over a water surface which comprises:
   a U-shaped float for partially surrounding a front wheel of the bike;
   a U-shaped float for partially surrounding a rear wheel of the bike;
   a U-shaped bar attached to the top of each of the U-shaped floats, said U-shaped bar providing means for attaching each U-shaped float to the bike adjacent its respective wheel, said attaching means comprising said U-shaped bar at each of its ends first being bent inwardly in a U-shaped manner, and then being bent upwardly so as to form a vertical section, said vertical section being further bent into a W-shape;
   a disk for powering said bike, said disk having a central opening for receiving an axle, said disk further comprising a plurality of sections adapted for propelling the bike over the water surface,
   said sections being of one-half hyperboloid shape and being attached to the disk in aligned pairs; one on each side of the disk;
   wherein said bike is supported on the water surface by said U-shaped floats and is propelled over the water surface of said powering disk.

* * * * *